(12) United States Patent
Rao et al.

(10) Patent No.: US 8,406,334 B1
(45) Date of Patent: Mar. 26, 2013

(54) OVERFLOW RESISTANT, FIXED PRECISION, BIT OPTIMIZED SYSTOLIC ARRAY FOR QR DECOMPOSITION AND MIMO DECODING

(75) Inventors: Raghavendar M. Rao, Austin, TX (US); Raied N. Mazahreh, Cottonwood Heights, UT (US); Hai-Jo Tarn, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 321 days.

(21) Appl. No.: 12/814,319

(22) Filed: Jun. 11, 2010

(51) Int. Cl.
*H04B 7/02* (2006.01)
*H04L 1/02* (2006.01)

(52) U.S. Cl. ........ 375/267; 375/340; 708/509; 708/400; 708/446; 708/442

(58) Field of Classification Search ................. 375/267, 375/340; 708/207, 209, 622, 400
See application file for complete search history.

(56) References Cited

U.S. PATENT DOCUMENTS

| | | | |
|---|---|---|---|
| 4,727,503 A | 2/1988 | McWhirter | |
| 4,777,614 A | 10/1988 | Ward | |
| 4,823,299 A | 4/1989 | Chang et al. | |
| 5,018,065 A | 5/1991 | McWhirter et al. | |
| 5,323,335 A | 6/1994 | Mitchell | |
| 5,475,793 A | 12/1995 | Broomhead et al. | |
| 6,675,187 B1 * | 1/2004 | Greenberger | 708/622 |
| 7,069,372 B1 | 6/2006 | Leung et al. | |
| 7,120,658 B2 | 10/2006 | Nash | |
| 7,489,746 B1 | 2/2009 | Awater et al. | |
| 7,606,207 B2 | 10/2009 | Becker et al. | |
| 7,685,219 B2 * | 3/2010 | Li | 708/400 |
| 7,933,353 B2 * | 4/2011 | Maltsev et al. | 375/267 |
| 8,190,549 B2 * | 5/2012 | Yang et al. | 706/46 |
| 2003/0018675 A1 * | 1/2003 | Asai et al. | 708/322 |
| 2004/0071207 A1 | 4/2004 | Skidmore et al. | |
| 2008/0028015 A1 | 1/2008 | Seki | |
| 2009/0110120 A1 * | 4/2009 | Mcnamara et al. | 375/340 |
| 2009/0116588 A1 * | 5/2009 | Mcnamara et al. | 375/340 |
| 2009/0310656 A1 * | 12/2009 | Maltsev et al. | 375/219 |
| 2011/0125819 A1 * | 5/2011 | Mazahreh et al. | 708/207 |
| 2011/0264721 A1 * | 10/2011 | Patel et al. | 708/209 |

OTHER PUBLICATIONS

Dirk Wübben, Ronald Böhnke, Volker Kühn, and Karl-Dirk Kammeyer, "MMSE-Based Lattice-Reduction for Near-ML Detection of MIMO Systems", Mar. 18-19, 2004, pp. 106-113, ITG Workshop on Smart Antennas.*
U.S. Appl. No. 12/552,171, filed Sep. 1, 2009, Rao et al.
U.S. Appl. No. 12/552,174, filed Sep. 1, 2009, Rao et al.
U.S. Appl. No. 12/552,178, filed Sep. 1, 2009, Rao et al.

(Continued)

*Primary Examiner* — David C. Payne
*Assistant Examiner* — Bahman Badipour
(74) *Attorney, Agent, or Firm* — LeRoy D. Maunu; Lois D. Cartier

(57) ABSTRACT

In one embodiment, a circuit for matrix decomposition is provided. The circuit includes an input circuit for receiving a first matrix. A permutation circuit is coupled to the input circuit and configured to interchange columns of the first matrix according to a selected permutation to produce a second matrix. A systolic array is coupled to the permutation circuit and configured to perform QR decomposition of the second matrix to produce a third matrix and a fourth matrix. A reverse permutation circuit is coupled to the systolic array and configured to interchange rows of the third matrix according to an inverse of the selected permutation to produce a first factor matrix and interchange rows of the fourth matrix according to the inverse of the selected permutation to produce a second factor matrix.

19 Claims, 10 Drawing Sheets

OTHER PUBLICATIONS

U.S. Appl. No. 12/552,180, filed Sep. 1, 2009, Rao et al.
U.S. Appl. No. 12/623,624, filed Nov. 23, 2009, Tarn et al.
U.S. Appl. No. 12/623,656, filed Nov. 23, 2009, Tarn et al.
U.S. Appl. No. 12/839,198, filed Jully 19, 2010, Rao.
Altera Corp., *QR Matrix Decomposition*, Application Note AN-506-2.0, Feb. 2008, pp. 1-55, Altera Corporation, San Jose, California, USA.
Bellis, S. J. et al., "Alternative systolic array for non-square-root Cholesky decoposition," *IEEE Proc.-Comput. Digit. Tech.*, Mar. 1997, pp. 57-64, vol. 144, No. 2, IEEE, Piscataway, New Jersey, USA.
Boher, Laurent et al., "Analysis of CORDIC-based Triangularization for MIMO MMSE Filtering " *Proc. of the 2008 IEEE International Symposium on Circuits and Systems (ISCAS 2008)*, May 18, 2008, pp. 948-951, IEEE, Piscataway, New Jersey, USA.
Böhnke, Ronald et al., "Reduced Complexity MMSE Detection for BLAST Architectures, " *Proc. of the 2003 IEEE Global Telecommunications Conference*, Dec. 1, 2003, pp. 2258-2262, vol. 4, IEEE, Piscataway, New Jersey, USA.
Brent, Richard P., *Computing the Cholesky Factorization Using a Systolic Architecture*, Sep. 1982, pp. 1-15, TR 82-521, Cornell University, Department of Computer Science, Ithaca, New York, USA.
Edman, Fredrik, *Digital Hardware Aspects of Multiantenna Algorithms*, PhD thesis, 2006, pp. 98, Lund University, Department of Electroscience, Lund, Sweden.
Edman, Fredrik et al., "A Scalable Pipelined Complex Valued Matrix Inversion Architecture, " *Proc. of the 2005 IEEE International Symposium on Circuits and Systems*, May 23, 2005, vol. 5, IEEE, Piscataway, New Jersey, USA.
El-Amawy, A. et al., "Parallel VLSI algorithm for stable inversion of dense matrices," *IEE Proceedings-E Computer and Digital Techniques*, Nov. 1989, pp. 575-580, vol. 136, Issue 6, IEEE, Piscataway, New Jersey, USA.
Gentleman, W. M. et al., "Matrix triangularization by systolic arrays, " *Proc. SPIE Symposium on Real-Time Signal Processing IV*, Aug. 1981, pp. 19-26, vol. 298.
Haller, B. et al., "Efficient Implementation of Rotation Operations for High Performance QRD-RLS Filtering," *Proc. of the 1997 IEEE International Conference on Application-Specific Systems, Architectures and Processors*, Jul. 14, 1997, pp. 162-174, IEEE, Piscataway, New Jersey, USA.
Hassibi, Babak, "An Efficient Square-Root Algorithm for BLAST" *Proc. of the 2000 IEEE International Conference on Acoustics, Speech and Signal Processing*, Jun. 5, 2000, pp. 737-740, vol. 2, IEEE, Piscataway, New Jersey, USA.
Haykin, Simon, *Adaptive Filter Theory*, 2002, pp. 838-841, Appendix F, Prentice Hall, Upper Saddle River, New Jersey, USA.
Hemkumar, Nariankadu, "Efficient Complex Matrix Transformations with Cordic, " *Proc. of the 1993 IEEE $11_{th}$ Symposium on Computer Arithmetic*, Jun. 29, 1993, pp. 122-129, IEEE, Piscataway, New Jersey, USA.
Hemkumar, Nariankadu D., *A Systolic VLSI Architecture for Complex SVD*, MS Thesis, May 1991, pp. 1-122, Rice University, Department of Electrical and Computer Engineering, Houston, Texas.
Karkooti, Marjan et al., "FPGA Implementation of Matrix Inversion Using QRD-RLS Algorithm," *Conference Record of the $39_{th}$ Asilomar Conference on Signals, Systems and Computers*, Oct. 28, 2005, pp. 1625-1629, IEEE, Piscataway, New Jersey, USA.
Kim, Hun Seok et al., "A Practical, Hardware Friendly MMSE Detector for MIMO-OFDM-Based Systems," *EURASIP Journal on Advances in Signal Processing*, 2008, p. 1-14, vol. 2008, Hindawi Publishing Corp., New York, New York, USA.
Laroche, Isabelle et al., "An Efficient VLSI Architecture of a Layered Space-Time Receiver," *Proc. of the IEEE $65^{th}$ Vehicular Technology Conference*, Apr. 1, 2007, pp. 387-391, IEEE, Piscataway, New Jersey, USA.
Ma, Lei et al., "Modified Givens Rotations and Their Application to Matrix Inversion," *Proc. of the International Conference on Acoustics, Speech and Signal Processing (ICASSP 2008)*, Mar. 31, 2008, pp. 1437-1440, IEEE, Piscataway, New Jersey, USA.
Porta, Tiba, *A Programmable Systolic Array for Factorial Data Analysis Part I: Matrix Computations*, Jun. 1987, pp. 1-17, Research Report YALEU/DCS/RR-542, Yale University, Department of Computer Science, New Haven, Connecticut, USA.
Salmela, Perttu et al., "DSP Implementation of Cholesky Decomposition," *Proc. of the 2006 Joint IST Workshop and Symposium on Trends in Communications (sympoTIC '06)*, Jun. 27, 2006, pp. 6-9, IEEE, Piscataway, New Jersey, USA.
Sayed, Ali, *Fundementals of Adaptive Filtering*, 2003, pp. 804-807, Section 12.A.1, John Wiley & Sons, Inc., Hoboken, New Jersey, USA.
Wyrzykowski, R. et al., "One-dimensional processor for arrays for linear algebraic problems," *IEEE Proc.-Comput. Digit. Tech.*, Jan. 1995, pp. 1-4, vol. 142, IEEE, Piscataway, New Jersey, USA.
Yang, Depeng et al., "An FPGA Implementation for Solving Least Square Problem," *Proc. of the 2009 $17_{th}$ IEEE Symposium on Field Programmable Custom Computing Machines*, Apr. 5, 2009, pp. 303-306, IEEE Computer Society, Washington, DC, USA.

\* cited by examiner

OVERFLOW RESISTANT, FIXED PRECISION, BIT OPTIMIZED SYSTOLIC ARRAY FOR QR DECOMPOSITION AND MIMO DECODING

FIELD OF THE INVENTION

The disclosed embodiments generally relate to applications utilizing QR matrix decomposition, and more particularly to the communication to multiple input antennas from multiple output (MIMO) antennas.

BACKGROUND

Data can be transmitted electromagnetically between a transmitting and a receiving antenna. The transmitter encodes the data into a sequence of symbols selected from a symbol constellation. The transmitting antenna transmits the symbols and the receiving antenna detects the symbols.

Interference from noise and reflections may corrupt the symbols received by the receiving antenna. For a maximum-likelihood detector, the receiver can compare the received signal with the expected received signal for all of the symbols in the constellation. The expected received signal that most closely matches the actual received signal provides the detected symbol.

A measurement of the characteristics of the communication medium helps proper symbol detection. In one example, the transmitter periodically transmits a known pattern of symbols to the receiver and the receiver uses the known pattern to determine the characteristics, such as multiple signal propagation paths, of the communication medium.

The data transfer rate may be increased by transmitting multiple symbols in parallel from multiple transmitting antennas. The detection of the multiple transmitted symbols improves by receiving the symbols with multiple receiving antennas. For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulation and a large number of antennas.

The disclosed embodiments may address one or more of the above issues.

SUMMARY

In one embodiment, a multiple input multiple output (MIMO) receiver circuit is provided. The receiver circuit includes a receiver front-end circuit configured to provide a set of channel transfer elements corresponding to radio frequency signals received on a subcarrier of a wireless channel by a plurality of antennas. Channel estimation circuitry is coupled to the receiver front-end circuit and configured to construct a channel matrix from a set of channel transfer elements. A preprocessing circuit is coupled to the channel estimation circuitry and is configured to receive input from channel matrix and reorder columns of the channel matrix into an input matrix according to an ordering that is selected based on first values in at least two of the columns. The receiver circuit includes a systolic array having boundary cells and internal cells. The preprocessing circuit is coupled to one of the boundary cells and a subset of the internal cells, and the boundary cells and internal cells are configured to perform QR decomposition and MMSE operations to produce a weight matrix. A post-processing circuit is coupled to the systolic array and configured to reorder rows of the weight matrix according to the selected ordering. An output circuit is coupled to the systolic array and configured to multiply the weight matrix by the matrix of unresolved symbols from the receiver front-end circuit to produce an estimate of isolated symbols corresponding to the unresolved symbols.

In another embodiment, the selected ordering swaps the column at column index 1 with the column at column index i, where i is less than or equal to the number of columns in the channel matrix. The reordering of the rows of the weighted matrix swaps the row at row index 1 with the row at row index i.

The reordering of the channel matrix, in another embodiment, is performed in response to the first element of column 1 having a value less than the first element of column i, wherein i is less than or equal to the number of columns in the channel matrix.

The reordering of the channel matrix is performed in response to the first element of column 1 having a value less than a selected threshold in another embodiment.

In another embodiment, the selected ordering has the column at column index 1 swapped with a column i. The first value in column i is greater than the selected threshold, and i is less than or equal to the number of columns in the channel matrix.

The selected ordering, in another embodiment, has columns sorted according to the value of the first element in each column, the sorting placing the column with the largest value at column index 1.

In another embodiment, the systolic array includes a first systolic array and a second systolic array. The first systolic array has boundary and internal cells, including the one of the boundary cells and a subset of the internal cells coupled to the preprocessing circuit. The first systolic array is configured to perform triangularization and back-substitution on the input matrix to produce an output matrix. The second systolic array is coupled to receive the output matrix of the first systolic array and is configured to perform right and left multiplication operations and cross-diagonal transposition on the output matrix to produce a weight matrix.

The second systolic array, in another embodiment, is coupled to the output of the first systolic array though the post-processing circuit. The post-processing circuit is coupled to the output of the first systolic array and is configured to reorder rows of the weight matrix according to the selected ordering by reordering rows of the matrix output from the first systolic array.

In another embodiment, the one of the boundary cells outputs a reciprocal of a number dependent on the input from the first column of the input matrix.

The boundary cells, other than the one boundary cell coupled to one of the pre-processing circuits, are respectively coupled to receive input from the internal cells in another embodiment. Each internal cell is respectively coupled to one of the boundary cells or one of the internal cells to receive a first input. Each internal cell is respectively coupled to one of the internal cells or one of the respective preprocessing circuits to receive a second input. While the first systolic array is performing triangularization, the boundary cells are configured to store respective first residues as a result of triangularization of the input matrix and to provide respective inverted residues from the first residues. The internal cells are configured to store respective second residues as a result of triangularization of the input matrix. While the first systolic array is performing back-substitution, the boundary cells are configured to respectively multiply the inverted first residues with the first inputs to provide first outputs, the internal cells are configured to respectively multiply the first inputs with the second residues to provide intermediate results, and the internal cells are further configured to respectively add the intermediate results with the second inputs to provide second outputs.

In another embodiment, a processor-implemented method of decoding MIMO signals is provided. A first matrix of inputs from a MIMO receiver is stored. The first matrix is reordered according to a selected permutation that is selected based on first values in at least two of the columns. The reordered first matrix is input into a first systolic array and QR decomposed by a processor by triangularizing the reordered first matrix with the first systolic array to produce a second matrix, performing an inversion of the second matrix to produce a third matrix, and performing a left multiplication on the third matrix to produce a fourth matrix. Cross-diagonal transposition is performed on the fourth matrix to produce a fifth matrix. Right multiplication is performed on the fifth matrix to produce a sixth matrix. One of second, third, fourth, fifth or sixth matrices is reverse permuted to place the sixth matrix in a non-permuted form. The sixth matrix is multiplied with a received signal vector to produce decoded MIMO signals.

The reverse permuting includes reordering the fifth matrix according to the transposition of the selected permutation in another embodiment.

In another embodiment, the reverse permuting includes reordering the fourth matrix according to the transposition of the selected.

The reverse permuting, in another embodiment, includes reordering the third matrix according to the transposition of the selected ordering.

In another embodiment, the reverse permuting includes reordering the second matrix according to the transposition of the selected ordering.

The inversion of the third matrix is performed by the first systolic array in another embodiment.

The left multiplication on the third matrix and right multiplication on the fourth matrix are performed by the first systolic array in another embodiment.

In another embodiment, the left multiplication, cross-diagonal transposition, and right multiplication are performed by a second systolic array.

The selected permutation, in another embodiment, swaps the column at index 1 with a column at an index i in response to the first element of the column 1 having a value less than the first element of column i.

In another embodiment, a circuit for matrix factorization is provided. The circuit includes an input configured to receive a first matrix. A permutation circuit is coupled to the input circuit and configured to interchange columns of the first matrix according to a selected permutation to produce a second matrix. A systolic array is coupled to the permutation circuit and configured to perform QR decomposition of the second matrix to produce a third matrix and a fourth matrix. A reverse permutation circuit is coupled to the systolic array and configured to interchange rows of the third matrix according to an inverse of the selected permutation to produce a first factor matrix and interchange rows of the fourth matrix according to the inverse of the selected permutation to produce a second factor matrix.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

In multiple input multiple output (MIMO) systems multiple (M) transmitting antennas transmit respective symbols in parallel to multiple (N) receiving antennas. Each of the receiving antennas receives a weight sum of the respective symbols transmitted from the transmitting antennas. Various methods exist to decode or separate the symbols transmitted by each transmitting antenna. One such method involves using a QR decomposition of the channel matrix to compute the MIMO decoding weight matrix. In the QR decomposition and MIMO decoding calculation, a systolic array can be used to increase streaming throughput. A systolic array is an interconnected matrix of individual signal processing units, or "cells," where the cells process individual elements of an input matrix and exchange processed output to perform an overall operation.

In many of the present methods, systolic array signal processing cells must perform calculations that are dominated by a multiplicative inverse ($1/x$) calculation of an input value (x). Alternatively, $1/\sqrt{x}$ could also be calculated. Small input values, resulting from the weakening of signals during transmission, cause the multiplicative inverse ($1/x$) or ($1/\sqrt{x}$) to become very large. This may cause inaccuracies in results compared to floating point implementations if larger number of bits are not allocated and this also may cause overflow to occur in the processing cells if the systolic array is not capable of processing values with a sufficient number of bits to store the multiplicative inverse.

Overflow occurs when a number becomes too large to be represented by the processing hardware. For example if a processor ALU is n-bits, than the largest number that can be output is $2^n$. For practical reasons, a typical ALU performs operations using only the lower n-bits of the result when overflow occurs. In QR decomposition and decoding MIMO symbols, this loss of precision can adversely affect the correct estimation of symbols or the computation of the QR decomposition. The conventional solution is to implement processing cells of the systolic array to allow values having a larger number of bits to be processed. This requires additional hardware, increasing the cost of hardware as well as the area needed to implement the systolic array.

The disclosed embodiments provide a method and circuit that prevent overflow and reduce hardware requirements of the systolic array by selectably arranging elements of the input matrix in a manner that prevents division operations from becoming dominated by weakened input symbols. The arranging of elements in matrices may also be referred to as reordering, swapping, interchanging, or permuting and such terms are used interchangeably herein.

Figure 1:
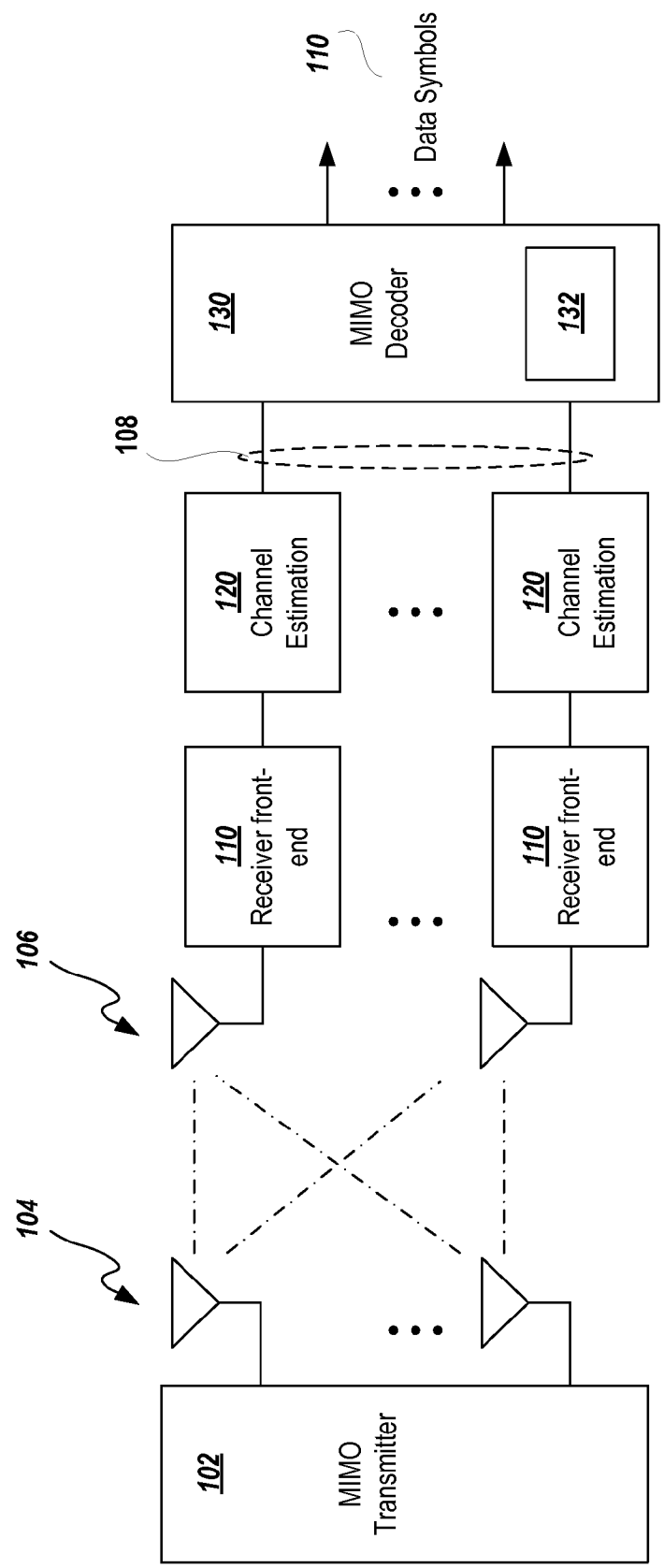
FIG. 1 is a block diagram depicting an exemplary embodiment of a MIMO communication system.

FIG. 1 is a block diagram depicting an exemplary embodiment of a MIMO communication system. MIMO transmitter 102 has multiple antennas 104, each of which transmits a different set of symbols in parallel. Antennas 106 receive signals respectively for receiver front-ends 110. The receiver front-end circuits 110 provide a set of channel transfer elements corresponding to a subcarrier of a wireless channel to channel estimation circuits 120. The channel estimation circuits 120 construct a channel matrix from the channel transfer elements. The channel estimation circuits 120 provide the channel matrix to MIMO decoder 130 via outputs 108. MIMO decoder 130 includes complex Givens rotation block 132. MIMO decoder 130 outputs decoded data symbols 110.

A model for the communication channel between the M transmitting antennas and the N receiving antennas is:

$$y = Hx + n$$

where H is an N×M channel matrix between the N receiving antennas and the M transmitting antennas, x is a column vector of M symbols transmitted from the transmitting antennas, n is a column vector of N received noise elements, and y is a column vector of N signals received at the receiving antennas. Each of the M transmitted symbols in column vector x is a symbol from a constellation having an order of w symbols.

An estimate $\hat{x}$ of the transmitted symbols can be computed by finding a weight matrix W that can multiply the received signal vector y. The weight matrix W can be computed using the minimum mean square error (MMSE) of inverse of H. The MMSE solution is given by:

$$W = (H^H H + \sigma^{-2} I_{nT})^{-1} H^H$$

The MMSE solution above requires the generation of the $H^H H$ matrix. In various solutions the $H^H H$ multiplication can be avoided by using an extended channel matrix defined as:

$$\underline{H} = \begin{bmatrix} H_{nR \times nT} \\ \sigma I_{nT} \end{bmatrix} \text{ and } \underline{y} = \begin{bmatrix} y_{nR \times 1} \\ 0_{nT} \end{bmatrix}$$

The estimate $\hat{x}$ is defined in terms of the extended channel matrix as:

$$\hat{x} = W\underline{y} = (\underline{H}^H \underline{H})^{-1} \underline{H}^H \underline{y} = \underline{H}^\dagger \underline{y}$$

Both solutions require a matrix inverse of the H matrix. This is accomplished through QR decomposition as follows:

$$H = QR$$

$$H^\dagger = R^{-1} Q^H$$

In the case of the extended channel matrix solution the QR decomposition of the extended matrix can be expressed as:

$$\underline{H} = \begin{bmatrix} H \\ \sigma I_{nT} \end{bmatrix} = \underline{Q}_{(n_T + n_R) \times (n_T + n_R)} R_{(n_T + n_R) \times n_T} = \begin{bmatrix} Q_{1(n_R \times (n_T + n_R))} \\ Q_{2(n_T \times (n_T + n_R))} \end{bmatrix} \underline{R}$$

By equating the lower block the following solution is obtained:

$$\sigma I_{nT} = Q_2 \underline{R} \Rightarrow \underline{R}^{-1} = \frac{1}{\sigma} Q_2$$

With this solution the estimate $\hat{x}$ can be expressed as:

$$\hat{x} = \underline{H}^\dagger \underline{y} = \underline{R}^{-1} [Q_1^H \quad Q_2^H] \underline{y} = \frac{1}{\sigma} Q_2 Q_1^H y = \underline{R}^{-1} Q_1^H y$$

where $$W = \underline{R}^{-1} \underline{Q}_1^H$$

$Q_1$ can be calculated by equating the upper block matrix as:

$$H = Q_1 \underline{R} \Rightarrow Q_1 = H \underline{R}^{-1}$$

The calculation of the weight matrix through MMSE QR decomposition can be implemented using one or more systolic arrays. A systolic array is an interconnected matrix of individual signal processing units or cells, where overall operation of the systolic array depends upon functions of the individual signal processing cells and the interconnection scheme of such signal processing cells. A clock signal may be applied to a systolic array to control data flow through each cell. Alternatively, operations of an individual cell may be triggered by the arrival of input data objects.

The interconnection scheme of some systolic arrays may include interconnects only between nearest neighbor signal processing cells within a systolic array. However, interconnection schemes are not limited to having only nearest neighbor interconnects.

In matrix processing operations, matrix elements are passed between cells according to element relationship and the function to be performed. For example, matrix multiplication is performed by inputting one row of the matrix at a time from the top of the array, which is passed down the array. The other matrix is input one column at a time from the left hand side of the array and passes from left to right. When each cell has processed one whole row and one whole column, the result of the multiplication is stored in the array and can now be output a row or a column at a time, flowing across or down the array.

The systolic array implementation of the MMSE calculation is advantageous because it is easily scalable as the number of antenna channels used increases. To calculate MMSE in a systolic array, the triangularization operation (which is part of QR decomposition) is performed on the extended channel matrix H and a triangular matrix R is generated. The triangularized matrix R is inverted using back-substitution within the systolic array to generate $R^{-1}$. The $Q_1$ matrix is then generated by left multiplication of the original channel matrix H with $R^{-1}$. $Q_1^H$, the Hermitian transpose of $Q_1$ is generated by some special circuitry and wiring between output and input of the systolic array. The weight matrix W is then generated by right multiplying $Q_1^H$ with $R^{-1}$. An estimate $\hat{x}$ is then computed by multiplying weight matrix W with received signal vector y.

The systolic array cells may be configured to operate in different modes to perform each function of the MMSE calculation. As such, some systolic array configurations will implement all functions of the MMSE calculation within a single systolic array with a different mode for each function to be performed. Alternatively, the various functions of the MMSE calculation may be performed by separate systolic arrays, where the output matrix of one array is passed as input to the next.

Figure 2:
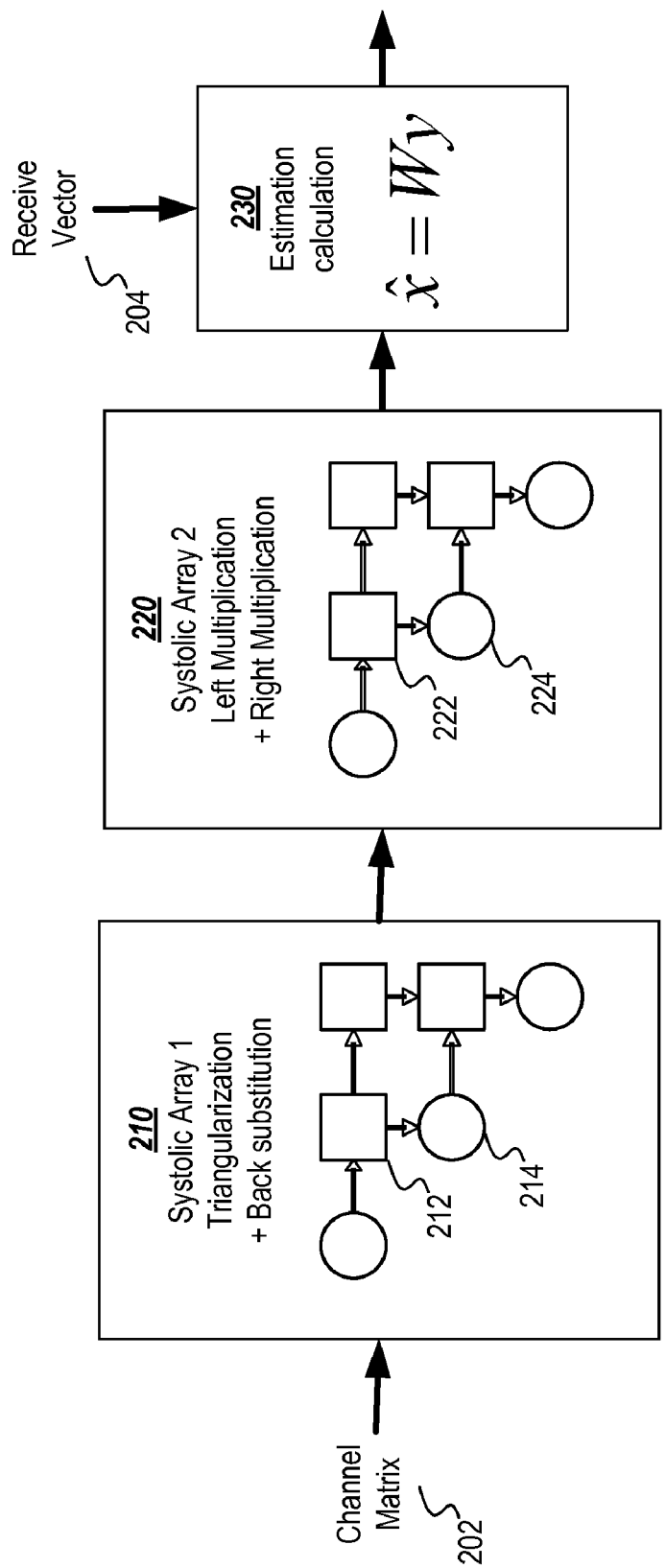
FIG. 2 shows a block diagram of an example systolic array system configured to perform minimum mean square error (MMSE) calculations.

FIG. 2 shows a block diagram of two systolic arrays configured to perform the MMSE calculation. In this example implementation, the processes of the calculation are split between two systolic arrays. One skilled in the art will recognize that the two systolic arrays may be consolidated into a single array or further divided into a larger number of systolic arrays. In this example implementation, a first systolic array 210 is configured to receive channel matrix 202 and perform triangularization and back substitution. The output of systolic array 210 is provided to a second systolic array 220, which is configured to perform right and left multiplication operations. The output systolic array 230 is multiplied by receive vector 204 in channel estimator 230 to produce an estimation of the received channels. The systolic arrays 210 and 220 include respective boundary cells 214 and 224 and internal cells 212 and 222.

Implementation of the boundary cells is different from the internal cells. Boundary cells are configured to calculate initial values that are passed on to and/or updated by the internal cells. For example, in triangularization, the boundary cells are configured to calculate rotation factors which are passed through and applied by the internal cells.

Systolic arrays for QR decomposition are advantageous in that they are fast and scale easily as the matrix size increases or, in the context of MMSE, as the number of MIMO antennas is increased. However, the MMSE calculation includes division operations, which may lead to overflow or loss of precision if the inputs become too small due to weakening of the symbols during transmission.

Figure 3:
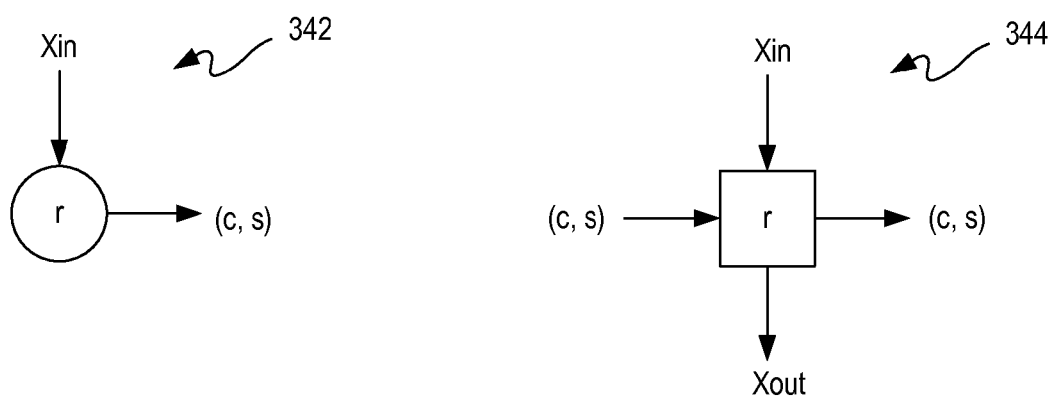
FIG. 3 shows a boundary cell and an internal cell of a systolic array for performing triangularization.

FIG. 3 shows block diagrams of cells for performing triangularization in a systolic array. Boundary cell 342 is configured for performing triangularization. Boundary cell 342 computes rotation factors c and s which are passed on to the neighboring internal cell. The rotation factors are initially c=1 and s=0 which are then computed based on input received and an accumulated value from previous c and s calculations. The c and s calculations are given by:

$$r_{new} = \sqrt{r_{old}^2 + x^2}$$
$$c = \frac{r_{old}}{r_{new}}$$
$$s = \frac{x}{r_{new}}$$

Rotation factors are calculated and updated as each element of the matrix is input to and processed by each cell. In calculating rotation factors c and s, the denominator value $r_{new}$ is dependent on the input x. When processing the first input to the boundary cell, the denominator value $r_{new}$ is equal to the square root of x. As a consequence, if the first input value x is very small, as a result of signal fading, the value of $1/\sqrt{(r_{old}^2 + x^2)}$ or $1/r_{new}$ from the above equations will be a very large number, leading to inaccurate results as compared to floating point implementations unless a large number of bits are used for the fixed point operations.

In contrast, when processing subsequent inputs to the boundary cell, the denominator value $r_{new}$ is dependent on both $r_{old}$ and x. If the first input is large, $r_{old}$ will also be large, ensuring that the denominator $r_{new}$ is not dominated by a small value x. It is therefore desirable to have the first input to a boundary cell be a larger value.

The disclosed embodiments prevent overflow and loss of precision by ensuring that the first input x to the boundary cell is sufficiently large to avoid overflow in the multiplicative inverse division operation. If the first element in the first column of the input matrix is a small value, the element is swapped with another element of the input matrix. This is performed by permuting the ordering of rows or columns of the matrix prior to QR decomposition with the systolic array. In this manner, the input of small initial values to the boundary cells can be avoided. This method allows fixed point implemented operations to be optimized to use fewer bits and reduce hardware requirements.

In the language of matrices, the columns or rows may be inter-changed to produce equivalent systems, which have the same solution as the original. A matrix may be permuted into an equivalent system and processed as the equivalent system. After processing is complete, the reverse permutation of the permuted result produces the un-permuted result.

The interchanging of rows and columns are represented by the multiplication of a matrix A with a permutation matrix P. Multiplication of permutation P with A produces the permuted matrix B which can be used for intermediate processing. Once intermediate processing is completed, the original matrix A is restored from the permuted result matrix B by multiplying B with reverse permutation matrix $P^T$. This relationship is shown by:

$$P*A=B, \text{ and}$$

$$A=P^T*B$$

The reverse permutation matrix $P^T$ is the inverse of the permutation matrix P. The product of $P^T$ and P produce what is known as the identity matrix I, which represents an equivalence between the original and resulting matrices. Example matrix A and permutation matrices are:

$$A = \begin{vmatrix} 1 & 2 & 3 \\ 4 & 5 & 6 \\ 7 & 8 & 9 \end{vmatrix} P = \begin{vmatrix} 0 & 1 & 0 \\ 0 & 0 & 1 \\ 1 & 0 & 0 \end{vmatrix} P^T = \begin{vmatrix} 0 & 0 & 1 \\ 1 & 0 & 0 \\ 0 & 1 & 0 \end{vmatrix}$$

$$P*P^T = I = \begin{vmatrix} 1 & 0 & 0 \\ 0 & 1 & 0 \\ 0 & 0 & 1 \end{vmatrix}$$

Using these matrices, permutation of A with P produces the permuted matrix:

$$P*A = B = \begin{vmatrix} 4 & 5 & 6 \\ 7 & 8 & 9 \\ 1 & 2 & 3 \end{vmatrix}$$

In this example, the permutation process moves the first, second and third rows to respective the third, first, and second rows. Reverse permutation of the permuted matrix B restores the original matrix:

$$P^T*B = A = \begin{vmatrix} 4 & 5 & 6 \\ 7 & 8 & 9 \\ 1 & 2 & 3 \end{vmatrix}$$

In this manner, the ordering of an input matrix can be changed for processing and restored, once processing is completed, to produce the correct result. The disclosed embodiments selectably permute the input channel matrix to allow elements to be processed in an order that does not result in processing overflow.

In the example implementation of FIG. 3, the internal processing cells are not subject to overflow. Internal cell 344 is configured for performing triangularization and consists of two multipliers at the input of an accumulator followed by shift register (not shown). Internal cell 344 applies rotations c and s computed in the preceding cell to the other columns of the input matrix. The inputs c and s receive the rotation factors from the boundary cell or from a preceding internal cell. These rotation factors are applied to the input element $X_{in}$ and are passed along to the neighboring internal cells. Output $X_{Out}$ is calculated with c and s rotation factors and an accumulated value from calculations of previous input. The c and s rotation factors are then passed to the next internal cell in the array. The calculation of output x is given by, $$X_{out} = -s \cdot r + c \cdot X_{in}$$

$$r(\text{new}) = c^* \cdot r + s^* \cdot X_{in}$$

In calculating the value of $X_{out}$, the value of $r_{new}$ is dependent on the values of Xin and $r_{old}$ which are calculated from previously processed elements of the channel matrix. Even if Xin is a weakened signal, $r_{old}$ will be sufficiently large to ensure that no overflow or loss of precision occurs.

In the previous example, pre-reordering is described in terms of column permutations and post-reordering in terms of row permutations. One skilled in the art will recognize that pre-reordering may be performed using column permutations and post-reordering in using row permutations as well.

In one embodiment, the channel matrix is permuted to prevent overflow in the first boundary cell. By ensuring that a sufficiently strong element is processed by this boundary cell, a sufficiently strong output from the boundary cell will propagate through the systolic array, preventing overflow from occurring in the other boundary cells as well.

Figure 4:
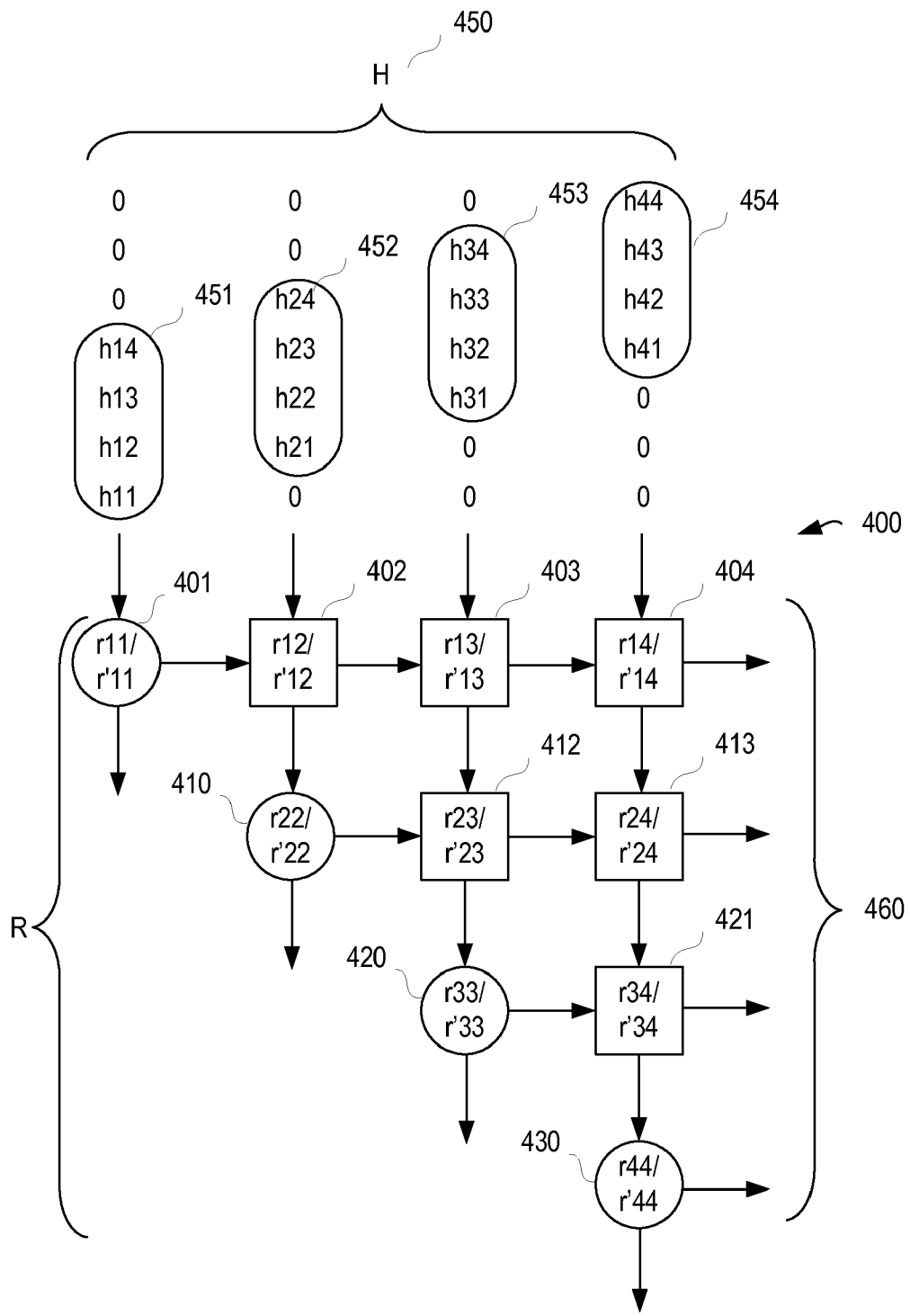
FIG. 4 shows an example systolic array configured to perform triangularization.

FIG. 4 shows an example systolic array configured to perform triangularization. Systolic array 460 includes boundary cells 401, 410, 420, and 430, and internal cells 402, 403, 404, 412, 413, and 421 arranged into interconnected rows and columns. Extended channel matrix H 450 shows how channel matrix elements are input to systolic array 400. Extended channel matrix H contains four rows 451, 452, 453, and 454 oriented in vertical columns for input. The extended channel matrix is serially input into the systolic array. The first row 451 of matrix H is clocked into an upper leftmost boundary cell 401. A second row 452 of matrix H is clocked into internal cell 402, and a third row 453 of matrix H is clocked into internal cell 403. Lastly, for the depicted example embodiment, a fourth row 454 of matrix H is clocked into internal cell 404. Due to clock delays, zero padding is used for the calculations to be performed directly.

Accordingly, a first input row 401 for input of matrix H is H1, 0, 0, 0 as respectively input to cells 401 through 404. Furthermore, a second input row 402 for input of matrix H includes values 0, H2, 0, 0, respectively input to cells 401 through 404. A third input row 403 for input of matrix H is 0, 0, H3, 0 as respectively input to cells 401 through 404. A fourth input row 404 for input of matrix H does not include any zero padding in the depicted exemplary embodiment; however, input rows after row 404 do include zero padding in the depicted exemplary embodiment. Accordingly, rows 451 through 454 of matrix H may be input as staggered with zero padding for multiplication.

As H is input and triangularization is performed, the c and s values calculated in boundary cell 401 will propagate through the array and be used for calculation in other cells. If overflow is prevented in boundary cell 401, the propagated c and s values will be values sufficient to ensure that Xin values input to other boundary cells are sufficiently large in order to prevent overflow or loss of precision in the other boundary cells.

When triangularization is complete, trained register values of the processing cells contain matrix R. On the right side of systolic array 400 output 460 may be obtained. If the systolic array is configured to perform back substitution in addition to triangularization, each cell will switch to a back substitution mode following triangularization, and would use the stored R values to perform the inversion operation. After back-substitution each cell would be trained to contain $R^{-1}$ values. The inverted matrix $R^{-1}$ would be shifted to outputs 460 on the right side of systolic array 400.

Alternately, if the systolic array were configured to operate in yet another mode to perform the left multiplication operation, the trained values, $R^{-1}$ would not be shifted to output but would be maintained within each cell to perform the left multiplication operation. In some embodiments, the trained stored values in a systolic array are referred to as residues and such terms are used interchangeably herein.

The systolic array implementations of FIGS. 2, 3 and 4 are described for exemplary purposes. It is understood that the disclosed embodiments are applicable to a number of other systolic arrays implementing the MMSE MIMO decoding as well as other QR decomposition processes that perform operations that are dominated by the multiplicative as the input values become small.

Figure 5:
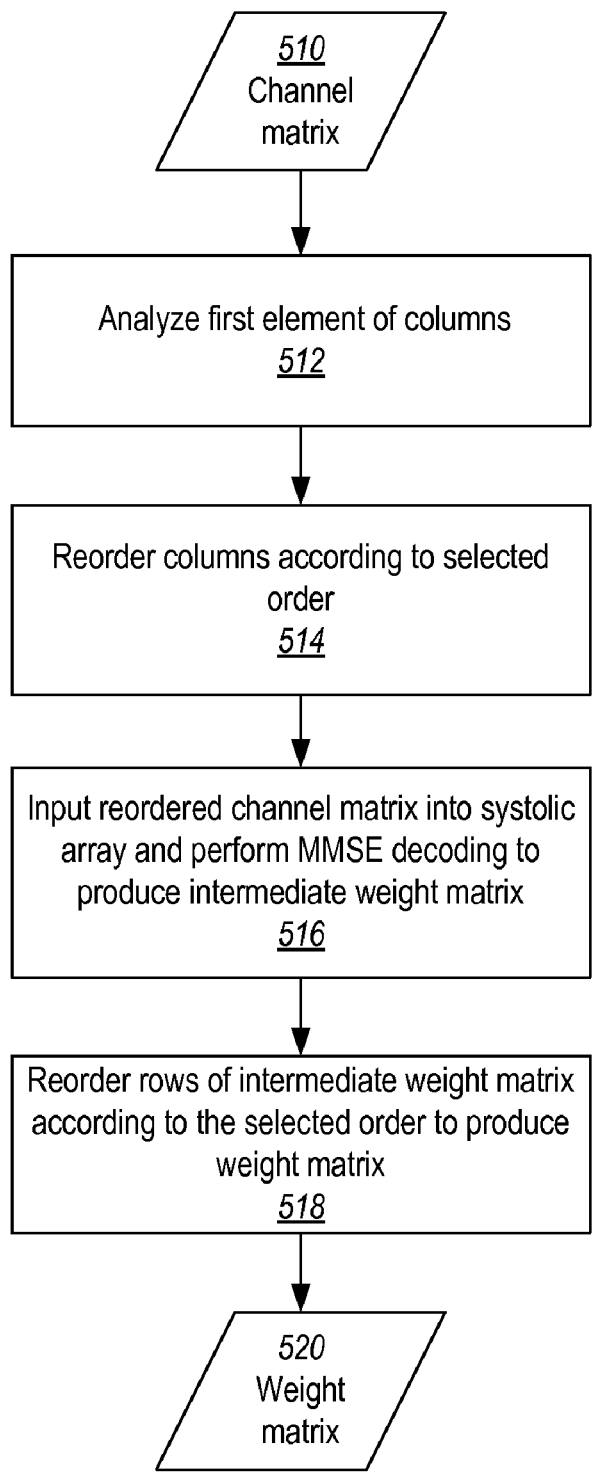
FIG. 5 illustrates a flowchart of a process to perform channel matrix permutation as part of the MMSE process.

FIG. 5 shows an implementation independent example process for MMSE decoding performed in accordance with one or more embodiments. A channel matrix 510 is input and analyzed to determine the first element of each column at step 512. Columns are reordered according to a selected permutation at step 514 to create a permuted channel matrix. The permuted channel matrix is input into the systolic array for MMSE decoding at step 516 producing an intermediate weight matrix. Rows of the intermediate weight matrix are reordered according to the selected permutation at step 518 to produce weight matrix 520.

The various embodiments described herein perform reordering according to a number of different permutations. For ease of explanation, the following example permutations are described in terms of sorting columns according to the first element in each column. One skilled in the art will recognize that the channel matrix may be reordered by permuting the rows according to the first element in each row.

In one embodiment, the permutation may entail sorting columns according to the strength of the first element in each of the columns. The columns may be sorted according to a number of various sorting methods such as: bubble sort, insertion sort, shell sort, merge sort, heap sort, quick sort, counting sort, bucket sort, radix sort, etc.

In several embodiments, swapping of two rows is sufficient to prevent overflow. In one such embodiment the first column is swapped with the column having the strongest first element of the respective columns. The permutation method may selectably interchange the first column with the column having the highest value in the first element of the respective columns.

In some embodiments, permutation may be selectably performed based on the value of the first element in the first column. The value of the first element is analyzed to determine whether the un-permuted input matrix will result in overflow. This may be performed by comparing the first value to a selected threshold value. If the value is less than the selected threshold value, permutation is performed according to the implemented permutation method. The selected threshold may be chosen to be the minimum value that will not cause an overflow.

Figure 6:
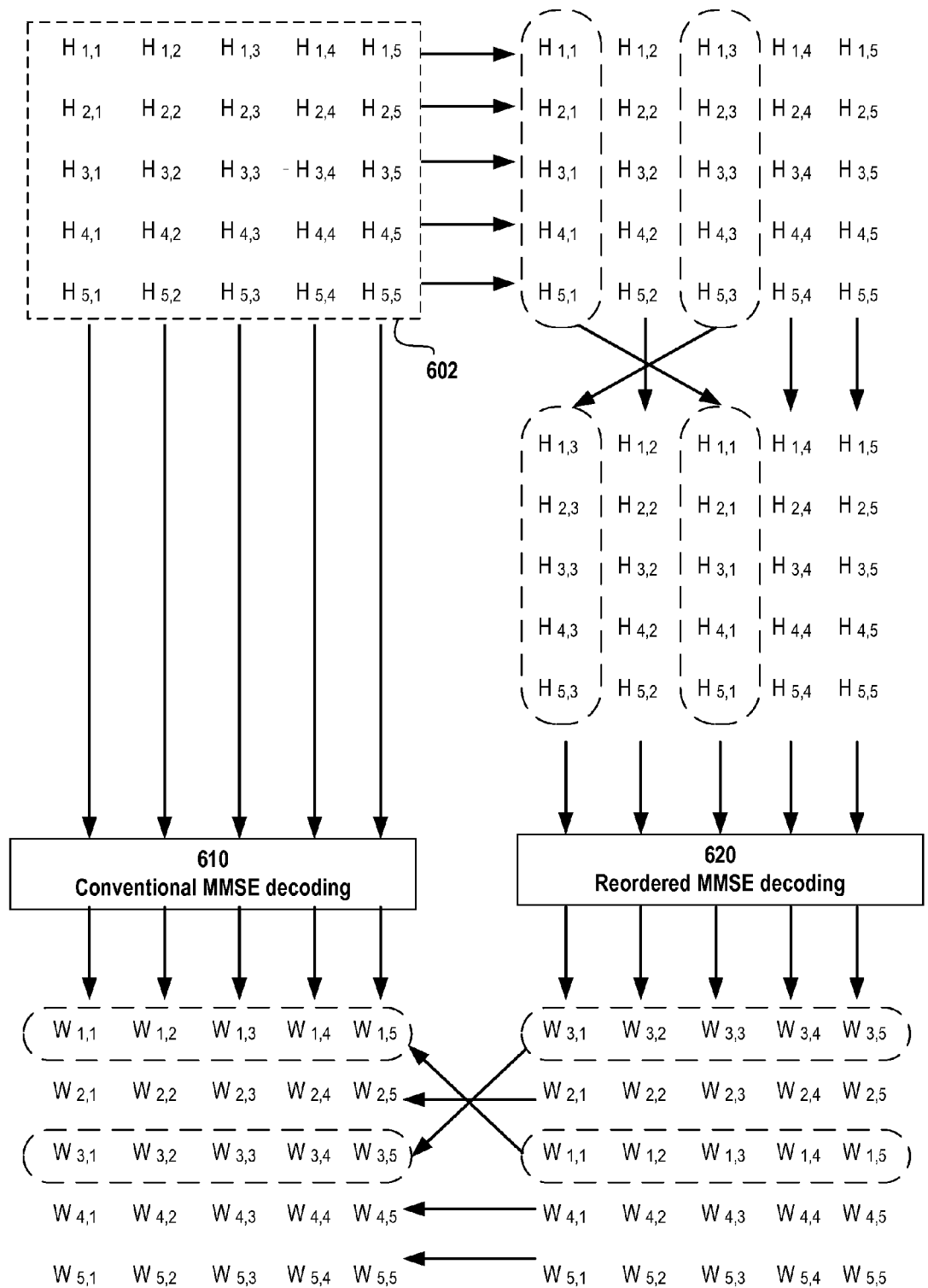
FIG. 6 illustrates the MMSE process performed on a channel matrix with and without intermediate permutation.

FIG. 6 shows a flowchart illustrating MMSE decoding with and without reordering of the channel matrix. Depending on the method and the sorting threshold, the channel matrix 602 may be processed in the original order by the MMSE systolic array as shown by 610, or may be reordered and processed without reordering as shown by 620. In this example, reordering the channel matrix 602 results in a swapping of the first column with the third column. After MMSE processing by 620 the output must be reordered according to the inverse of the original permutation. In this case rows 1 and 3 are swapped because columns 1 and 3 were swapped. In this manner, the same weight matrix can be computed in a manner that allows the channel matrix to be reordered to avoid overflow of the systolic array boundary cells.

The above permutation methods are provided for exemplary purposes. One skilled in the art will recognize that a number of other permutation methods may be used as well.

Figure 7:
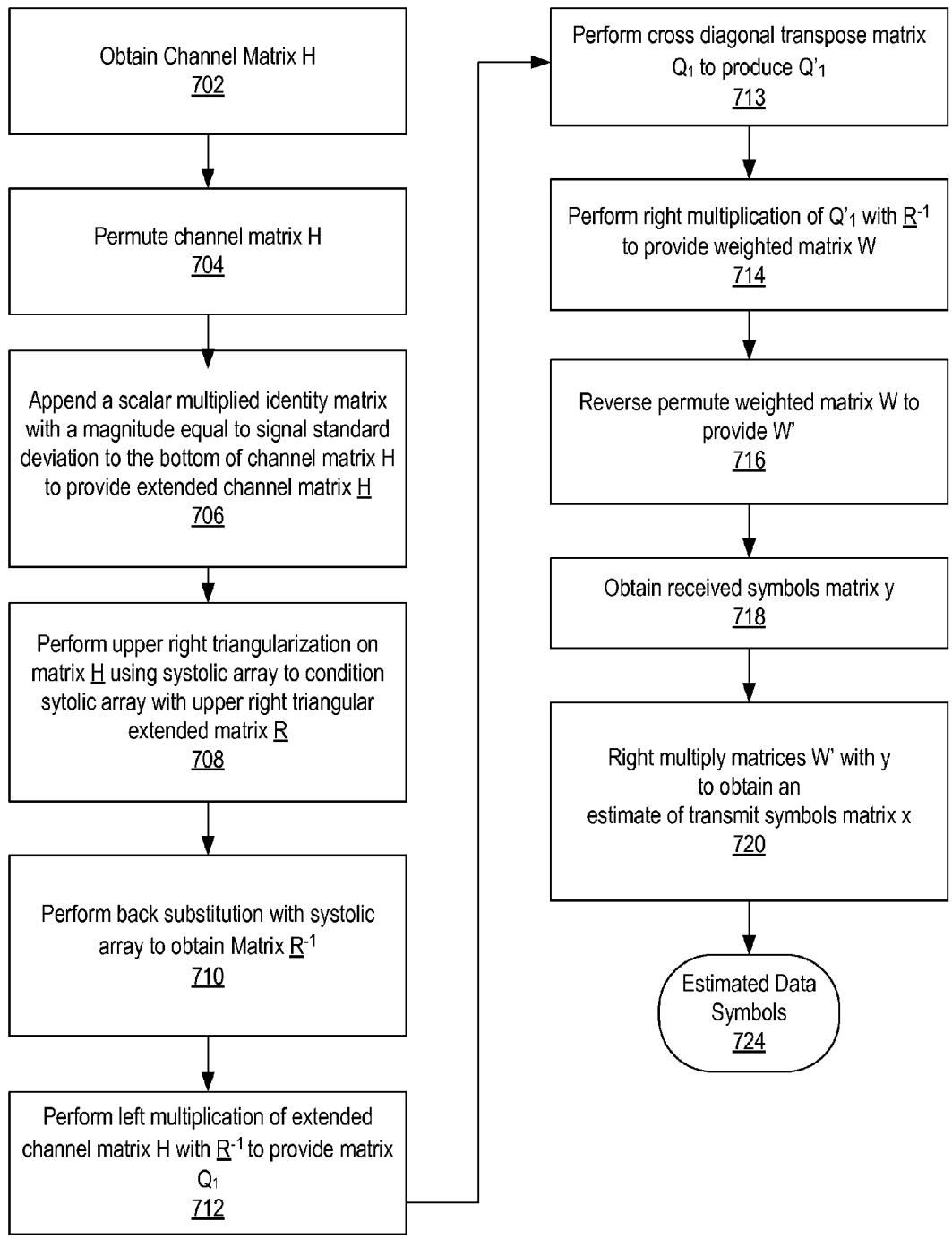
FIG. 7 illustrates a flowchart of the MMSE process utilizing permutation of the channel matrix.

FIG. 7 illustrates a flowchart of a process to decode channel symbols of multiple subcarriers in a MIMO receiver. Channel matrix H, is received at step 702. Matrix H is permuted with a permutation matrix P as discussed above at step 704. A scalar-multiplied identity matrix with a magnitude determinant equal to signal standard deviation is appended to the bottom of matrix Hat step 706 to produce extended channel matrix H.

Upper right triangularization is performed on the extended channel matrix H at step 708 using a systolic array, which conditions the systolic array with triangularized matrix R. Back substitution is performed on R at step 710 to obtain inverted matrix $R^{-1}$. Left multiplication of extended channel matrix H with $R^{-1}$ is performed at step 712 to provide matrix $Q_1$. Cross diagonal transposition is performed on matrix $Q_1$ at step 713 to produce $Q'_1$. Right multiplication of $Q'_1$ with $R^{-1}$ is then performed to provide weight matrix W at step 714.

Reverse permutation is performed on weight matrix W with reverse permutation matrix $P^T$ at step 716 to place the matrix in un-permuted form W'. Received symbols matrix y is obtained at step 718 and right multiplied with matrix W' to obtain an estimate of transmit symbols matrix X at step 720. Estimated data symbols 724 are output from X.

Although the embodiments are primarily described in terms of MMSE decoding, one skilled in the art will recognize that these embodiments may be utilized in a number of other applications which perform QR decomposition. For example, the systolic array is configured to perform QR decomposition by performing steps 702, 704, 706, 708, 710, and 712 to produce respective Q and R matrices.

Figure 8:
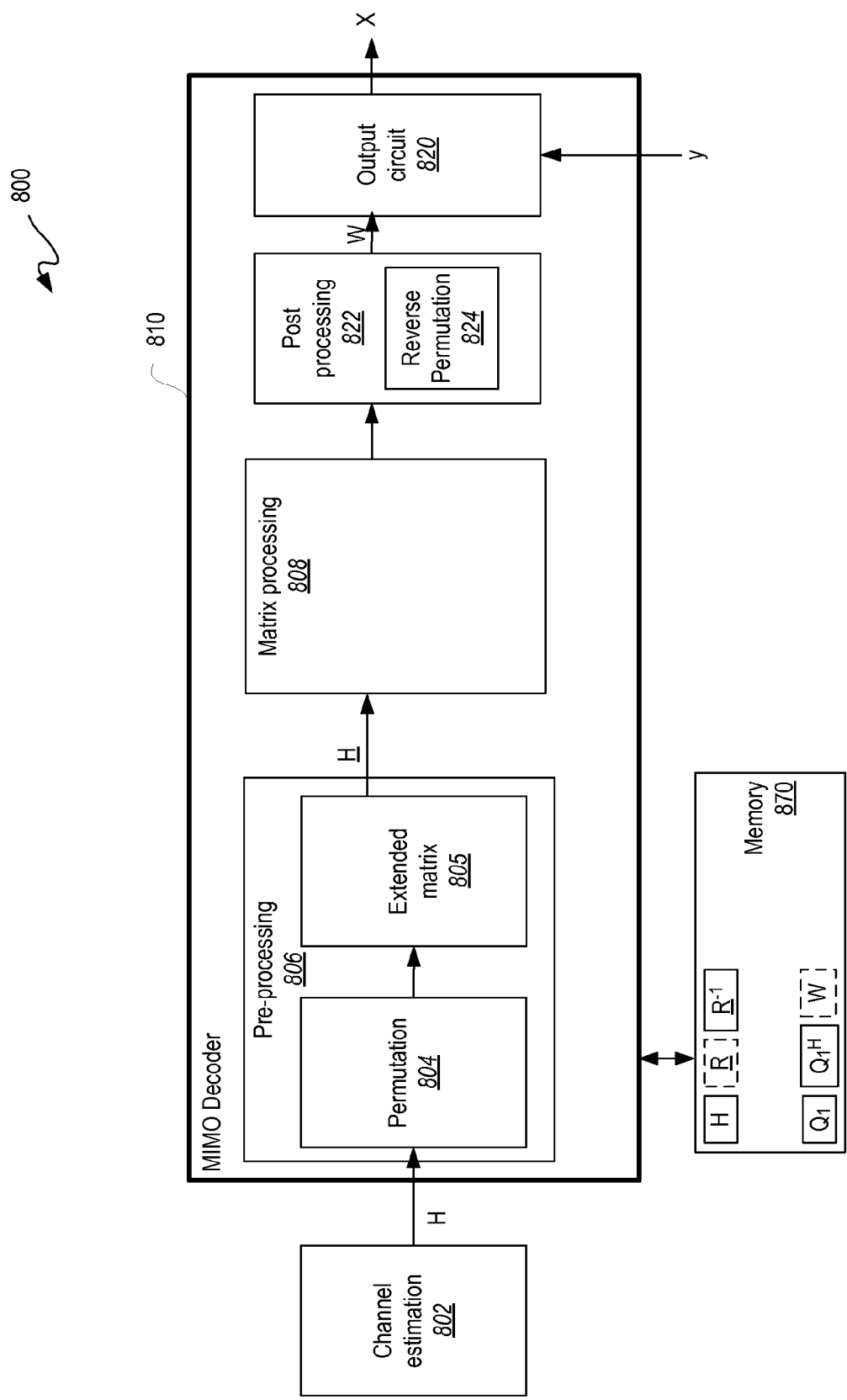
FIG. 8 shows a block diagram of a MIMO receiver configured to perform channel matrix permutation.

FIG. 8 is a block diagram of a MIMO receiver 800 including channel estimation circuit 802 and MIMO decoder 810. Channel estimation circuit 802 provides channel coefficients of each subcarrier, which may be organized in the form of a channel matrix H, to MIMO decoder 810. MIMO decoder 810 includes a preprocessing block 806, a matrix processing block 808, and post processing block 822. A memory unit 870 is coupled to MIMO decoder 810 and is used to store intermediate matrices produced during the decoding process. In this example implementation, pre-processing circuit 806 includes permutation block 804 and extended matrix circuit 805. Permutation circuit 804 reorders the channel matrix H to avoid processing overflow in matrix processing block 808. The permuted matrix H is received by extended matrix circuit 805 which appends a scalar multiplied identity matrix with a magnitude determinant equal to signal standard deviation to the bottom of interleaved channel matrix H to provide an extended channel matrix H.

Matrix processing block 808 performs the MMSE operation on the extended channel matrix to produce weight matrix W. Matrix processing block 808 contains one or more systolic arrays (not shown) to perform the MMSE operations. The post processing block 822 includes a reverse permutation circuit 824 for performing reverse permutation on the weight matrix W to produce matrix W'. Output circuit 820 multiplies each by a symbol selection vector y to output an estimated symbol matrix X.

Figure 9:
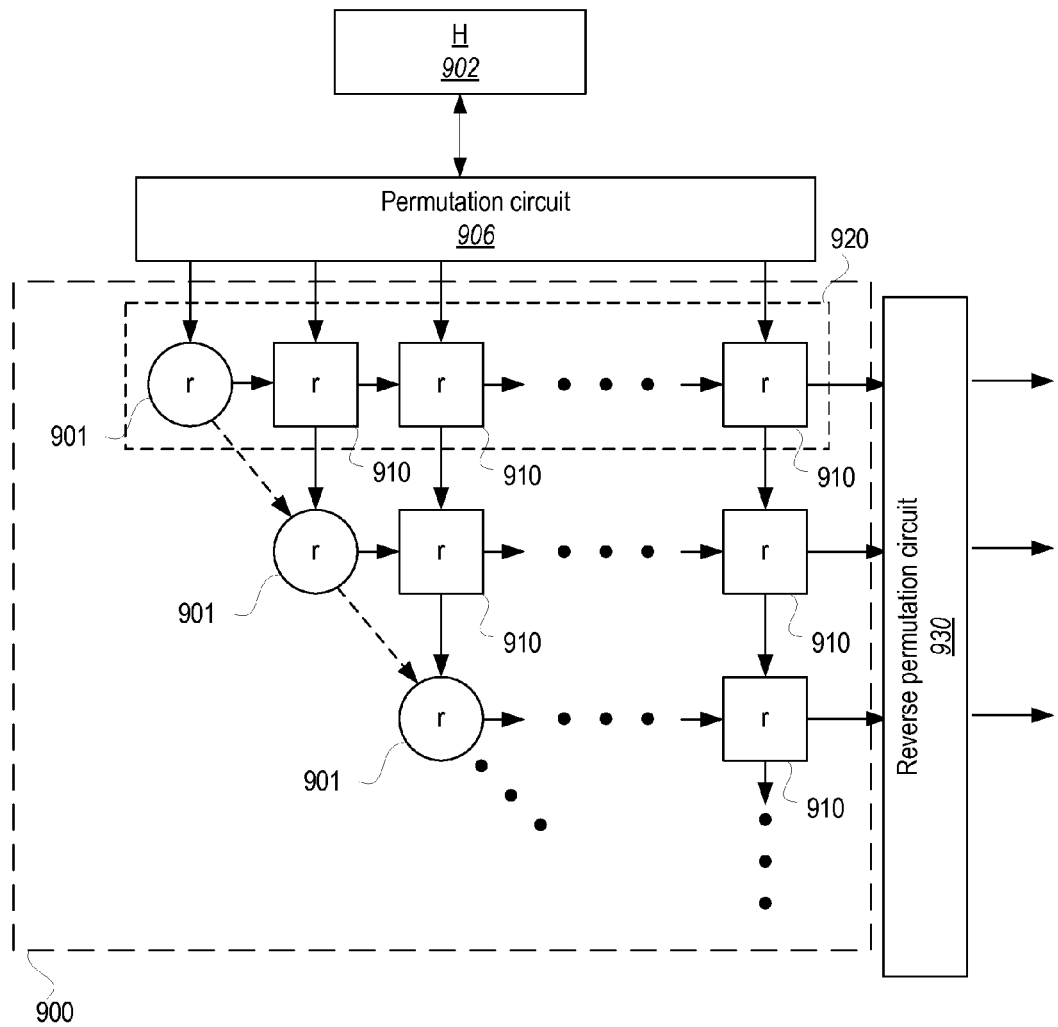
FIG. 9 is a block diagram of a systolic array with a permutation circuit.

FIG. 9 is a block diagram of a permutation circuit connected to a systolic array. This example illustrates the operation of the permutation of the channel matrix to a MMSE MIMO Decoding systolic array. Permutation circuit 906 receives input from a channel matrix 902. Appropriate rows or columns of the channel matrices are streamed as input to the input row 920 of a systolic array 900 containing one of the boundary cells 901 and a subset of the internal cells 910. The rows or columns are streamed to the processing cells of input row 920 according to the implementing permutation method. Output from systolic array 900 is reordered by reverse permutation circuit 930. It should be appreciated that the permutation and reverse-permutation circuits 906 and 930 may be implemented with routing circuitry such as multiplexers and demultiplexers or may perform permutation by selecting the memory locations to retrieve input values from.

Figure 10:
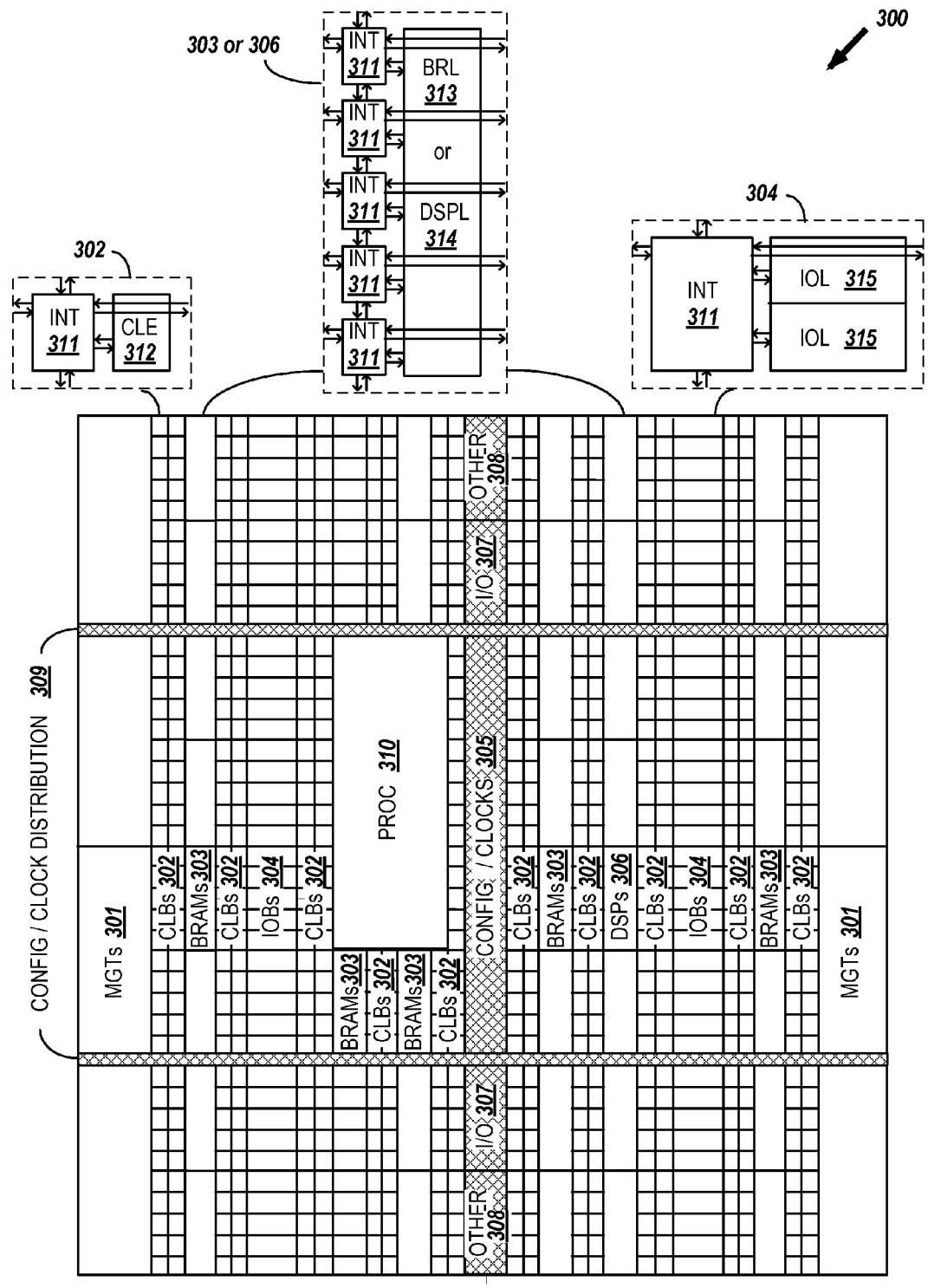
FIG. 10 is a block diagram of a programmable integrated circuit which may be configured to implement a MIMO decoder.

FIG. 10 is a block diagram of a programmable integrated circuit, specifically an FPGA, which may be configured to implement a systolic array with permutation performed in accordance with one or more embodiments. FPGAs and other programmable integrated circuits can include several different types of programmable logic blocks in the array. For example, FIG. 10 illustrates an FPGA architecture (300) that includes a large number of different programmable tiles including multi-gigabit transceivers (MGTs 301), configurable logic blocks (CLBs 302), random access memory blocks (BRAMs 303), input/output blocks (IOBs 304), configuration and clocking logic (CONFIG/CLOCKS 305), digital signal processing blocks (DSPs 306), specialized input/output blocks (I/O 307), for example, clock ports, and other programmable logic 308 such as digital clock managers, analog-to-digital converters, system monitoring logic, and so forth. Some FPGAs also include dedicated processor blocks (PROC 310).

In some FPGAs, each programmable tile includes a programmable interconnect element (INT 311) having standardized connections to and from a corresponding interconnect element in each adjacent tile. Therefore, the programmable interconnect elements taken together implement the programmable interconnect structure for the illustrated FPGA. The programmable interconnect element INT 311 also includes the connections to and from the programmable logic element within the same tile, as shown by the examples included at the top of FIG. 10.

For example, a CLB 302 can include a configurable logic element CLE 312 that can be programmed to implement user logic plus a single programmable interconnect element INT 311. A BRAM 303 can include a BRAM logic element (BRL 313) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 306 can include a DSP logic element (DSPL 314) in addition to an appropriate number of programmable interconnect elements. An IOB 304 can include, for example, two instances of an input/output logic element (IOL 315) in addition to one instance of the programmable interconnect element INT 311. As will be clear to those of skill in the art, the actual I/O pads connected, for example, to the I/O logic element 315 are manufactured using metal layered above the various illustrated logic blocks, and typically are not confined to the area of the input/output logic element 315.

In the pictured embodiment, a columnar area near the center of the die (shown shaded in FIG. 10) is used for configuration, clock, and other control logic. Horizontal areas 309 extending from this column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic. For example, the processor block PROC 310 shown in FIG. 10 spans several columns of CLBs and BRAMs.

Note that FIG. 10 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 10 are purely exemplary. For example, in an actual FPGA more than one adjacent column of CLBs is typically included wherever the CLBs appear, to facilitate the efficient implementation of user logic.

The present invention is thought to be applicable to a variety of systolic arrays configured for QR decomposition of a matrix and MIMO decoding. Other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A multiple input multiple output (MIMO) receiver circuit, comprising:
a receiver front end circuit configured to provide a set of channel transfer elements corresponding to radio frequency signals received on a subcarrier of a wireless channel by a plurality of antennas;
a channel estimation circuit coupled to the receiver front end circuit and configured to construct a channel matrix from the set of channel transfer elements;
a preprocessing circuit coupled to the channel estimation circuit, wherein the preprocessing circuit is configured to:
receive the channel matrix; and
reorder columns of the channel matrix into an input matrix according to an ordering that is selected based on a value of a first element of column 1;
a systolic array having boundary cells and internal cells, wherein the preprocessing circuit is coupled to one of the boundary cells and a subset of the internal cells, and the boundary cells and internal cells are configured to perform QR decomposition and minimum mean square error (MMSE) MIMO decoder weight matrix computation operations to produce a weight matrix;
a post-processing circuit coupled to the systolic array and configured to reorder rows of the weight matrix according to the selected ordering; and
an output circuit coupled to the systolic array and configured to multiply the weight matrix by the matrix of unresolved symbols from the receiver front-end circuit to produce an estimate of isolated symbols corresponding to the unresolved symbols.

2. The MIMO receiver circuit of claim 1, wherein:
the selected ordering has the column at column index 1 swapped with the column at an column index i, wherein i is less than or equal to a number of columns in the channel matrix; and
the reorder of the rows of the weight matrix swaps the row at row index 1 with the row at row index i.

3. The MIMO receiver circuit of claim 1, wherein the reorder of the channel matrix is performed in response to the first element of column 1 having a value less than a first element of column i, wherein i is less than or equal to a number of columns in the channel matrix.

4. The MIMO receiver circuit of claim 1, wherein the reorder of the channel matrix is performed in response to the first element of column 1 having a value less than a selected threshold.

5. The MIMO receiver circuit of claim 4, wherein:
the selected ordering has the column at column index 1 swapped with a column i, i being less than or equal to a number of columns in the channel matrix;
the first value in column i is greater than the selected threshold.

6. The MIMO receiver circuit of claim 1, wherein the selected ordering has columns sorted according to the value of the first element in each column, the sorting placing the column with the largest value at column index 1.

7. The MIMO receiver circuit of claim 1, wherein the systolic array includes:
a first systolic array having boundary and internal cells, including the one of the boundary cells and a subset of the internal cells coupled to the preprocessing circuit, the first systolic array configured to perform triangularization and back-substitution on the input matrix to produce an output matrix; and
a second systolic array coupled to receive the output matrix of the first systolic array, wherein the second systolic array is configured to perform right and left multiplication operations and cross-diagonal transposition on the output matrix to produce a weight matrix.

8. The MIMO receiver circuit of claim 7, wherein:
the second systolic array is coupled to the output of the first systolic array though the post-processing circuit; and
the post-processing circuit is coupled to the output of the first systolic array and is configured to reorder rows of the weight matrix according to the selected ordering by reordering rows of the matrix output from the first systolic array.

9. The MIMO receiver circuit of claim 1, wherein the one of the boundary cells outputs a reciprocal of a number dependent on the input from the first column of the input matrix.

10. The MIMO receiver circuit of claim 7, wherein:
the boundary cells, other than the one boundary cell coupled to one of the pre-processing circuits, are respectively coupled to receive input from the internal cells;
each internal cell is respectively coupled to one of the boundary cells or one of the internal cells to receive a first input;
each internal cell is respectively coupled to one of the internal cells or one of the respective preprocessing circuits to receive a second input;
while the first systolic array is performing triangularization:

the boundary cells are configured to store respective first residues as a result of triangularization of the input matrix and to provide respective inverted residues from the first residues; and the internal cells are configured to store respective second residues as a result of triangularization of the input matrix; and while the first systolic array is performing back-substitution:

the boundary cells are configured to respectively multiply the inverted first residues with the first inputs to provide first outputs;

the internal cells are configured to respectively multiply the first inputs with the second residues to provide intermediate results; and the internal cells are further configured to respectively add the intermediate results with the second inputs to provide second outputs.

11. A processor-implemented method of decoding multiple input multiple output (MIMO) signals, comprising
storing a first matrix of inputs from a MIMO receiver;
reordering the first matrix according to a selected permutation that is selected based on a value of a first element of column 1;
inputting the reordered first matrix into a first systolic array;
QR decomposing the first matrix by performing steps by a processor including:
triangularizing the reordered first matrix with the first systolic array to produce a second matrix;
performing an inversion of the second matrix to produce a third matrix; and
performing a left multiplication on the third matrix to produce a fourth matrix;
performing a cross-diagonal transposition on the fourth matrix to produce a fifth matrix;
performing right multiplication on the fifth matrix to produce a sixth matrix;
reverse permuting one of second, third, fourth, fifth or sixth matrices to place the sixth matrix in a non-permuted form;
multiplying the sixth matrix with a received signal vector to produce decoded MIMO signals; and
outputting the decoded MIMO signals.

12. The method of claim 11, wherein the reverse permuting includes reordering the fifth matrix according to the transposition of the selected permutation.

13. The method of claim 11, wherein the reverse permuting includes reordering the fourth matrix according to the transposition of the selected.

14. The method of claim 11, wherein the reverse permuting includes reordering the third matrix according to the transposition of the selected ordering.

15. The method of claim 11, wherein the reverse permuting includes reordering the second matrix according to the transposition of the selected ordering.

16. The method of claim 11, wherein the inversion of the third matrix is performed by the first systolic array.

17. The method of claim 11, wherein the left multiplication on the third matrix and right multiplication on the fourth matrix are performed by the first systolic array.

18. The method of claim 11, wherein the left multiplication, cross-diagonal transposition, and right multiplication are performed by a second systolic array.

19. The method of claim 11, wherein the selected permutation swaps the column at index 1 with a column at an index i in response to the first element of the column 1 having a value less than the first element of column i.

* * * * *